United States Patent
Teng et al.

(10) Patent No.: US 9,662,861 B2
(45) Date of Patent: May 30, 2017

(54) HOUSING MANUFACTURING METHOD, COMPOSITE BOARD, AND HOUSING

(71) Applicant: WISTRON CORP., New Taipei (TW)

(72) Inventors: Li-Sheng Teng, New Taipei (TW); Ching-Fu Hsu, New Taipei (TW); Yen-Chi Liu, New Taipei (TW)

(73) Assignee: WISTRON CORP., New Taipei (TW)

( * ) Notice: Subject to any disclaimer, the term of this patent is extended or adjusted under 35 U.S.C. 154(b) by 376 days.

(21) Appl. No.: 14/138,118

(22) Filed: Dec. 22, 2013

(65) Prior Publication Data

US 2015/0044401 A1    Feb. 12, 2015

(30) Foreign Application Priority Data

Aug. 12, 2013   (TW) .............................. 102128877 A

(51) Int. Cl.
*B32B 7/12*       (2006.01)
*B32B 17/02*     (2006.01)
(Continued)

(52) U.S. Cl.
CPC .................. *B32B 7/12* (2013.01); *B32B 5/20* (2013.01); *B32B 5/245* (2013.01); *B32B 17/02* (2013.01); *B32B 37/12* (2013.01); *B32B 2255/02* (2013.01); *B32B 2255/26* (2013.01); *B32B 2262/101* (2013.01);
(Continued)

(58) Field of Classification Search
CPC  B32B 17/066; B32B 7/12; B32B 5/20; B32B 5/245; B32B 17/02; B32B 2457/202; B32B 2457/20; B32B 37/12; Y10T 428/249984; Y10T 428/1314
See application file for complete search history.

(56) References Cited

U.S. PATENT DOCUMENTS 4,994,309 A * 2/1991 Reichert ............. E06B 3/66319
                                                                156/109
5,578,142 A * 11/1996 Hattori .................. H01L 31/048
                                                                136/251

(Continued)

FOREIGN PATENT DOCUMENTS

CN         101564928 A      10/2009
CN         201536460 U       7/2010
(Continued)

OTHER PUBLICATIONS

J.A. Nemes and K.E. Simmonds, "Low-Velocity Impact Response of Foam-Core Sandwich Composites," Journal of Composite Materials, vol. 26, No. 4 (1992).*

(Continued)

*Primary Examiner* — Jeremy R Pierce
(74) *Attorney, Agent, or Firm* — CKC & Partners Co., Ltd.

(57) ABSTRACT

The disclosure discloses a housing manufacturing method including: providing a first fiberglass plate; coating a first glue on the first fiberglass plate; providing a second fiberglass plate; covering the second fiberglass plate onto the first glue; and curing the first glue to become a cushion adhesive layer, in which the first fiberglass plate, the cushion adhesive layer, and the second fiberglass plate constitute a composite board. The disclosure further discloses a housing manufactured by the foregoing composite plate manufacturing method.

5 Claims, 7 Drawing Sheets

(51) Int. Cl.
*B32B 5/20* (2006.01)
*B32B 5/24* (2006.01)
*B32B 37/12* (2006.01)

(52) U.S. Cl.
CPC ... *B32B 2266/0278* (2013.01); *B32B 2307/51* (2013.01); *B32B 2307/54* (2013.01); *B32B 2457/00* (2013.01); *B32B 2457/20* (2013.01); *B32B 2457/202* (2013.01); *Y10T 428/1314* (2015.01); *Y10T 428/249984* (2015.04)

(56) References Cited

U.S. PATENT DOCUMENTS

| | | | | |
|---|---|---|---|---|
| 6,182,403 | B1* | 2/2001 | Mimura | E04D 3/362 126/621 |
| 8,449,808 | B2 | 5/2013 | Lin | |
| 2008/0127607 | A1* | 6/2008 | Schiffmann | B29C 70/443 52/793.11 |
| 2009/0053490 | A1* | 2/2009 | Clausi | C08G 18/10 428/213 |
| 2012/0260587 | A1* | 10/2012 | Pini | F24J 2/0444 52/173.3 |
| 2012/0321840 | A1 | 12/2012 | Wu et al. | |
| 2015/0030791 | A1 | 1/2015 | Tsuchiya et al. | |

FOREIGN PATENT DOCUMENTS

| | | |
|---|---|---|
| TW | 201245292 A | 11/2012 |
| TW | 201247396 A | 12/2012 |
| TW | 201249651 A | 12/2012 |

OTHER PUBLICATIONS

The office action of the corresponding Chinese application issued on Sep. 6, 2015 and its partial English translation.
The office action of the corresponding Taiwanese application issued on Nov. 23, 2015.

* cited by examiner

HOUSING MANUFACTURING METHOD, COMPOSITE BOARD, AND HOUSING

RELATED APPLICATIONS

This application claims priority to Taiwanese Application Serial Number 102128877, filed Aug. 12, 2013, which is herein incorporated by reference.

BACKGROUND

Technical Field

The present disclosure relates to a housing manufacturing method, a composite board, and a housing.

Description of Related Art

With the progress of modern society in science and technology, people have become increasingly demanding for consumer electronic products (e.g., in compact volume, diverse functions, and textured appearance, etc.). Compact design is at the heart of modern consumer electronic products. As to a high-end electronic product, the material of its housing can be formed by metal or carbon fiber composites. Both of the materials feature high stiffness and lightweight for use in small-sized products (e.g., smart phones, and portable navigation devices, etc.), middle-sized products (e.g., notebook computers, and tablet computers, etc.), and large-sized products (e.g., All-in-One computers, and LCD TVs, etc.). However, the prices of both of the materials are high. If the forgoing materials are applied to low-end electronic products, the costs of the electronic products cannot be reduced.

Accordingly, how to provide an improved composite board having features of low cost, high stiffness, and lightweight becomes an important issue in the an.

SUMMARY

The disclosure provides a housing manufacturing method. The housing manufacturing method includes: providing a first fiberglass plate; coating a first glue on the first fiberglass plate; providing a second fiberglass plate; covering the second fiberglass plate onto the first glue; and curing the first glue to become a cushion adhesive layer, in which the first fiberglass plate, the cushion adhesive layer, and the second fiberglass plate constitute a composite board.

In an embodiment of the disclosure, the step of curing the first glue to become the cushion adhesive layer further includes: continuously hot laminating the first fiberglass plate, the first glue, and the second fiberglass plate based on a temperature range for a first curing time, so as to make the first glue become the cushion adhesive layer.

In an embodiment of the disclosure, the temperature range is 50-70° C.

In an embodiment of the disclosure, the step of curing the first glue to become the cushion adhesive layer further includes: continuously laminating the first fiberglass plate, the first glue, and the second fiberglass plate at room temperature for a second curing time, so as to make the first glue become the cushion adhesive layer.

In an embodiment of the disclosure, the material of the first glue comprises a chemical resin having a function of foaming.

In an embodiment of the disclosure, the cushion adhesive layer is a polyurethane foam layer.

In an embodiment of the disclosure, the first fiberglass plate and the second fiberglass plate are formed by hot laminating pluralities of glass fiber clothes, respectively.

In an embodiment of the disclosure, the housing manufacturing method further includes: stamping the composite board, so as to make the composite board have at least one slotted hole; and injection molding an engineering plastic onto the composite board, so as to make the engineering plastic be embedded in the slotted hole and thus form a housing with the composite board.

In an embodiment of the disclosure, the housing manufacturing method further includes: coating a second glue on the composite board; and injection molding an engineering plastic onto the composite board, so as to make the second glue be adhered between the engineering plastic and the composite board and thus form a housing with engineering plastic and the composite board.

The disclosure further provides a composite board. The composite board includes a first fiberglass plate, a second fiberglass plate, and a cushion adhesive layer. The cushion adhesive layer is adhered between the first fiberglass plate and the second fiberglass plate.

The disclosure further provides a housing. The housing includes a composite board and an engineering plastic. The composite board includes a first fiberglass plate, a second fiberglass plate, and a cushion adhesive layer. The cushion adhesive layer is adhered between the first fiberglass plate and the second fiberglass plate. The engineering plastic is fixed on the composite board.

In an embodiment of the disclosure, the composite board has at least one slotted hole, and the engineering plastic is embedded in the slotted hole.

In an embodiment of the disclosure, the housing further includes a second glue adhered between the composite board and the engineering plastic.

Accordingly, the laminated fiberglass plates of the composite board manufactured by the housing manufacturing method of the disclosure provide stiffness that is similar to metal, and the cushion adhesive layer that is laminated between the fiberglass reduces the density of the composite board. Hence, the composite board of the disclosure can effectively reduce the cost and still has the features of high stiffness and lightweight. Furthermore, the composite board manufactured by the housing manufacturing method of the disclosure can be combined with the engineering plastic by injection molding, so as to manufacture the low-cost housing that can be widely applied to various kinds of electronic products.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
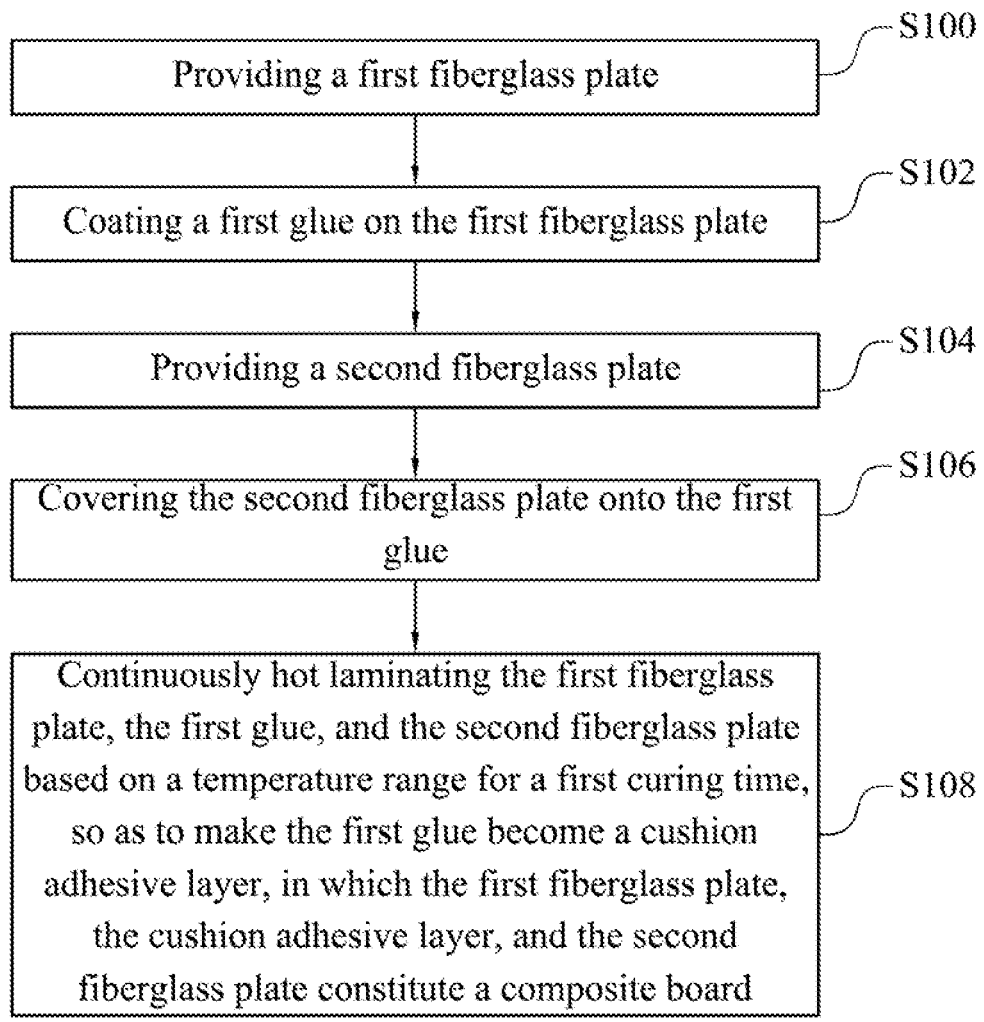
FIG. 1 is a flow chart diagram of a housing manufacturing method according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 5A:
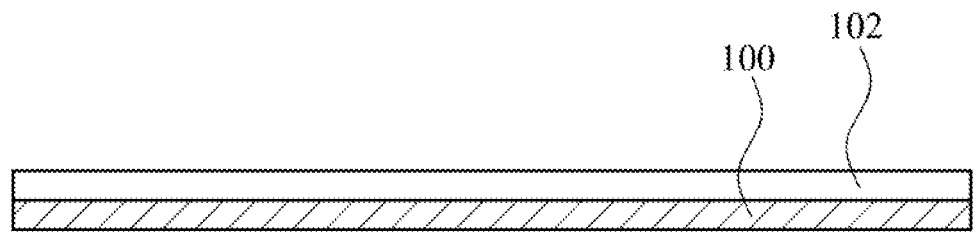
FIG. 5A to FIG. 5C are schematic diagrams corresponding to the steps of the housing manufacturing method in FIG. 1.
Figure 5B:
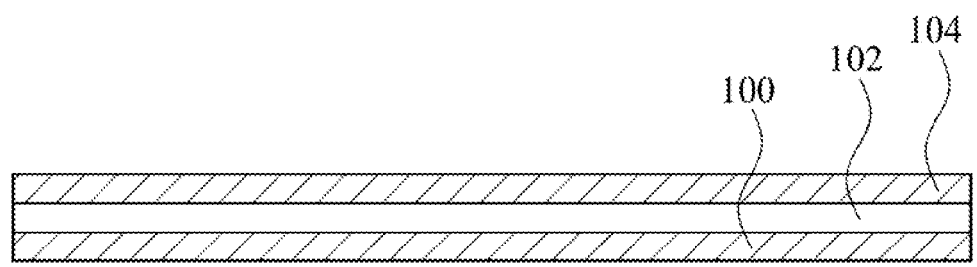
Figure 5C:
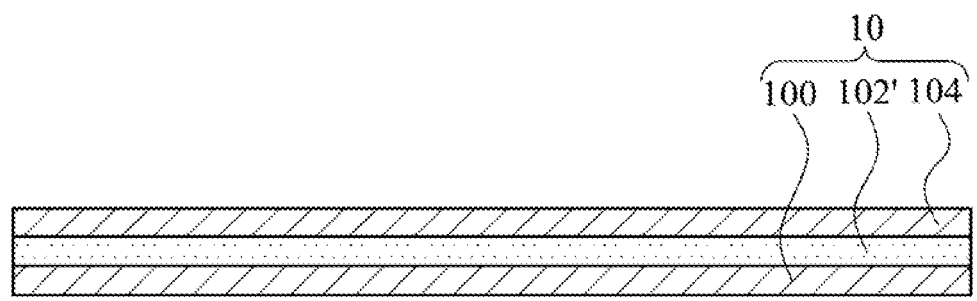

FIG. 1 is a flow chart diagram of a housing manufacturing method according to an embodiment of the disclosure. FIG. 5A to FIG. 5C are schematic diagrams corresponding to the steps of the housing manufacturing method in FIG. 1.

As shown in FIG. 1 FIG. 5A, and FIG. 5B, the housing manufacturing method includes steps S100 to S106 shown below.

S100: providing a first fiberglass plate 100.

S102: coating a first glue 102 on the first fiberglass plate 100.

S104: providing a second fiberglass plate 104.

S106: covering the second fiberglass plate 104 onto the first glue 102.

In the embodiment of the disclosure, the first fiberglass plate 100 and the second fiberglass plate 104 are formed by hot laminating pluralities of glass fiber clothes, respectively (e.g., each of the first fiberglass plate 100 and the second fiberglass plate 104 are formed by three pieces glass fiber clothes). In an embodiment of the disclosure, the widths of the first fiberglass plate 100 and the second fiberglass plate 104 are 0.3-0.45 mm, and the area sizes of the first fiberglass plate 100 and the second fiberglass plate 104 depend on the required products.

Furthermore, the material of the first glue 102 used in the embodiment of the disclosure includes a chemical resin having a function of foaming.

As shown in FIG. 1 and FIG. 5C, the housing manufacturing method further includes step S108 shown below.

S108: continuously hot laminating the first fiberglass plate 100, the first glue 102, and the second fiberglass plate 104 based on a temperature range for a first curing time, so as to make the first glue 102 become a cushion adhesive layer 102', in which the first fiberglass plate 100, the cushion adhesive layer 102', and the second fiberglass plate 104 constitute a composite board 10.

In the embodiment of the disclosure, the temperature range is 50-70° C. but the disclosure is not limited in this regard. For example, if the first fiberglass plate 100, the first glue 102, and the second fiberglass plate 104 are hot laminated at 60° C., the first curing time is three days according to practical experiments. If the curing time needs to be reduced, the temperature for curing the first glue 102 can be increased to 90° C.

Furthermore, in practice, the first fiberglass plate 100, the first glue 102, and the second fiberglass plate 104 can be placed in a fixture (not shown) with predetermined thickness and then be laminated, so as to control the thickness of the cured cushion adhesive layer 102'. The cushion adhesive layer 102' performs the function of adhering the first fiberglass plate 100 and the second fiberglass plate 104. In an embodiment of the disclosure, the cured cushion adhesive layer 102' can become a foam material with thickness of 0.25-0.4 mm by using the fixture, but the disclosure is not limited in this regard.

In the embodiment of the disclosure, cushion adhesive layer 102' is a polyurethane foam layer.

Figure 2:
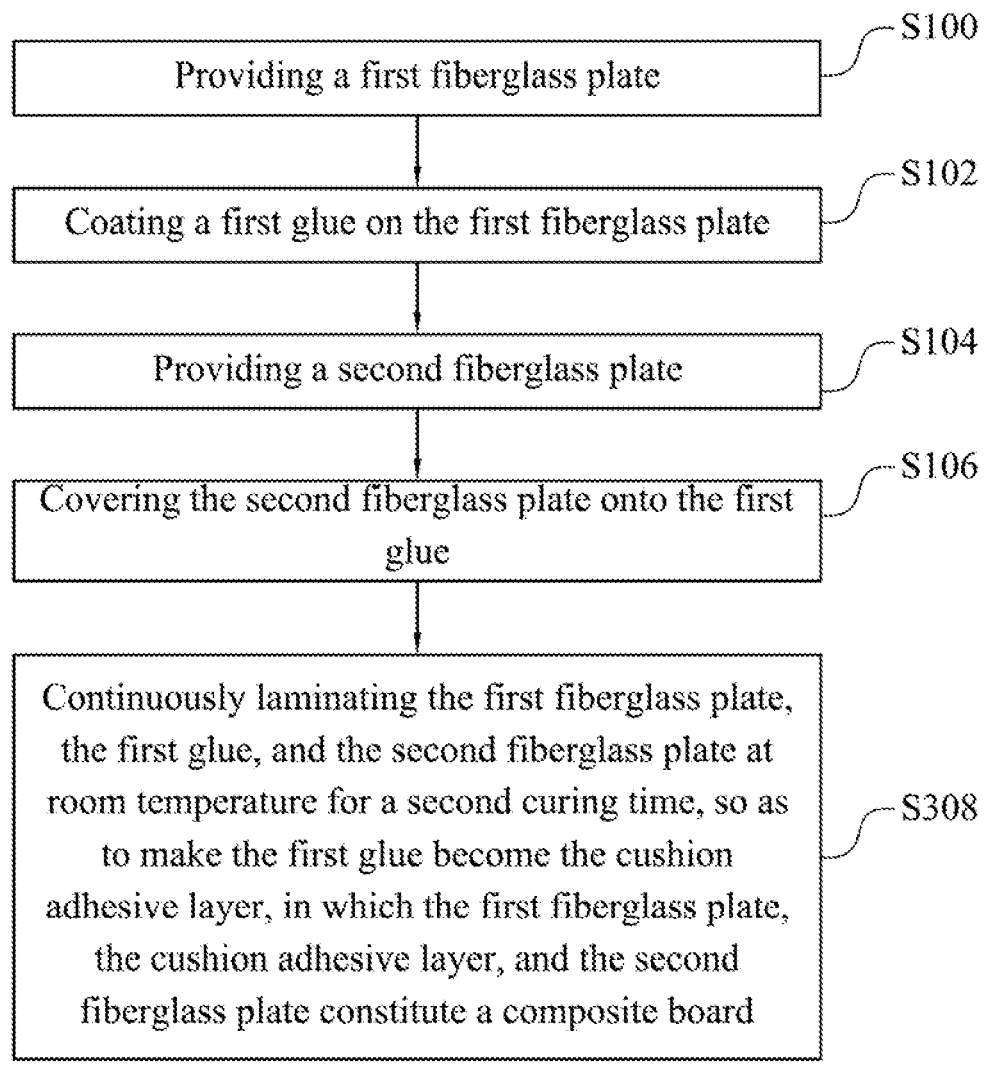
FIG. 2 is a flow chart diagram of a housing manufacturing method according to another embodiment of the disclosure.

However, the composite board 10 of the disclosure not only can be formed within the above-mentioned temperature range. FIG. 2 is a flow chart diagram of a housing manufacturing method according to another embodiment of the disclosure. The embodiment of FIG. 2 replaces the step S108 in FIG. 1 by step S308 shown below.

S308: continuously laminating the first fiberglass plate 100, the first glue 102, and the second fiberglass plate 104 at room temperature for a second curing time, so as to make the first glue 102 become the cushion adhesive layer 102', in which the first fiberglass plate 100, the cushion adhesive layer 102', and the second fiberglass plate 104 constitute a composite board 10.

If the first fiberglass plate 100, the first glue 102, and the second fiberglass plate 104 are laminated at room temperature, the second curing time is seven days according to practical experiments.

Figure 3:
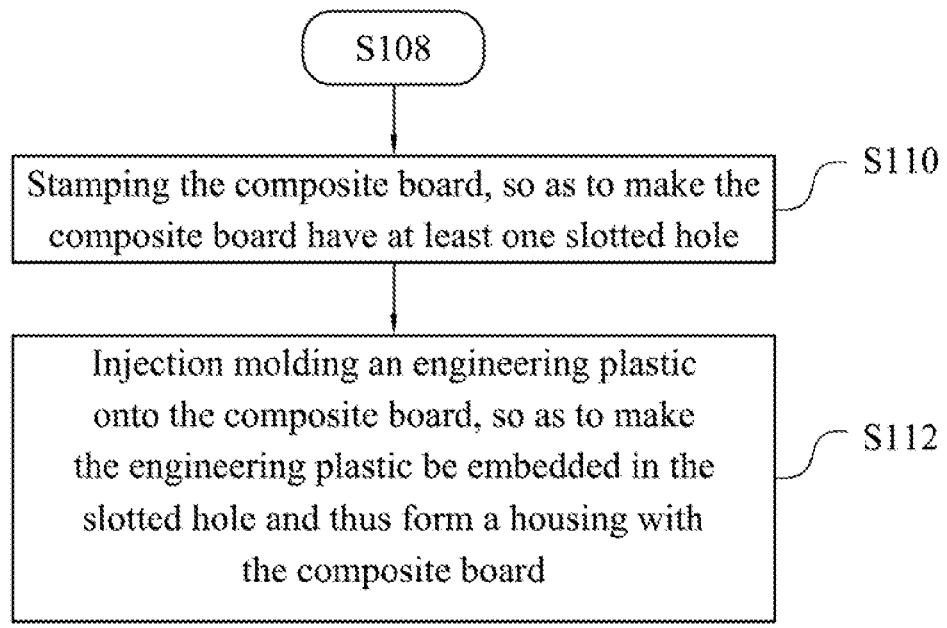
FIG. 3 is a detailed flow chart diagram of the housing manufacturing method in FIG. 1.
Figure 5D:
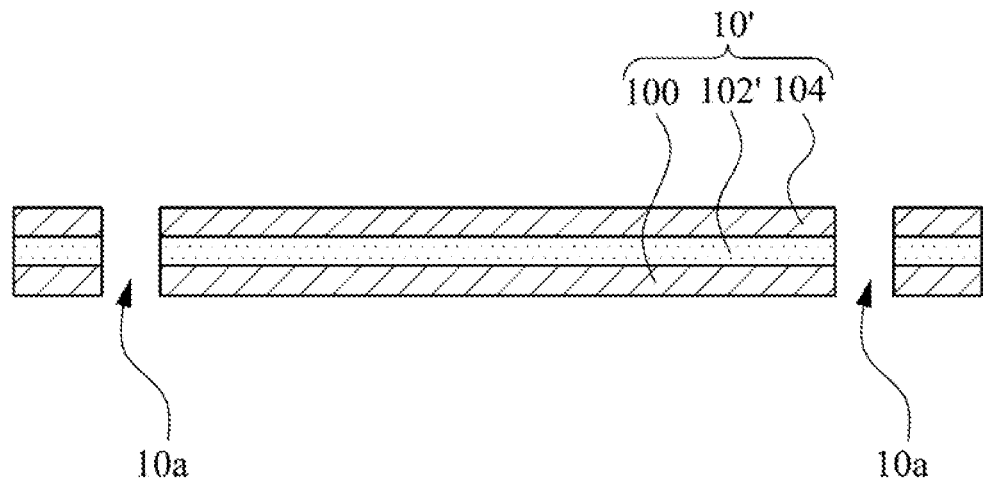
FIG. 5D and FIG. 5E are schematic diagrams corresponding to the steps of the housing manufacturing method in FIG. 3.
Figure 5E:
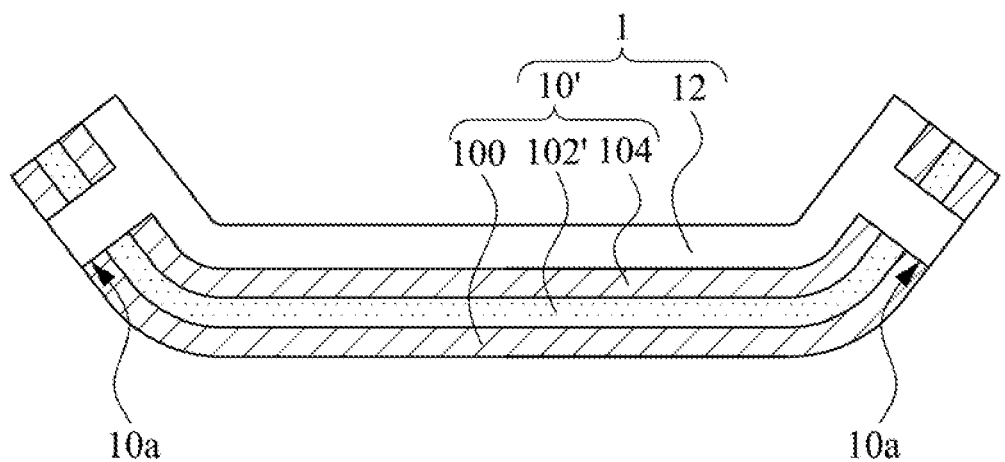

FIG. 3 is a detailed flow chart diagram of the housing manufacturing method in FIG. 1. FIG. 5D and FIG. 5E are schematic diagrams corresponding to the steps of the housing manufacturing method in FIG. 3.

As shown in FIG. 3, FIG. 5D, and FIG. 5E, the housing manufacturing method further includes steps S110 and S112 shown below.

S110: stamping the composite board 10, so as to make the composite board 10' have at least one slotted hole 10a.

S112: injection molding an engineering plastic 12 onto the composite board 10', so as to make the engineering plastic 12 be embedded in the slotted hole 10a and thus form a housing 1 with the composite board 10'.

It should be pointed out that the shape, the number, and the entire pattern of the slotted hole 10a stamped on the composite board 10' is not limited and can be adjusted as needed. During injection molding, the composite board 10' can be firstly placed in a mold (not shown), and then the engineering plastic 12 is injection molded onto the composite board 10', so as to make the engineering plastic 12 be embedded in the slotted hole 10a of the composite board 10' and thus obtain the housing 1.

Figure 4:
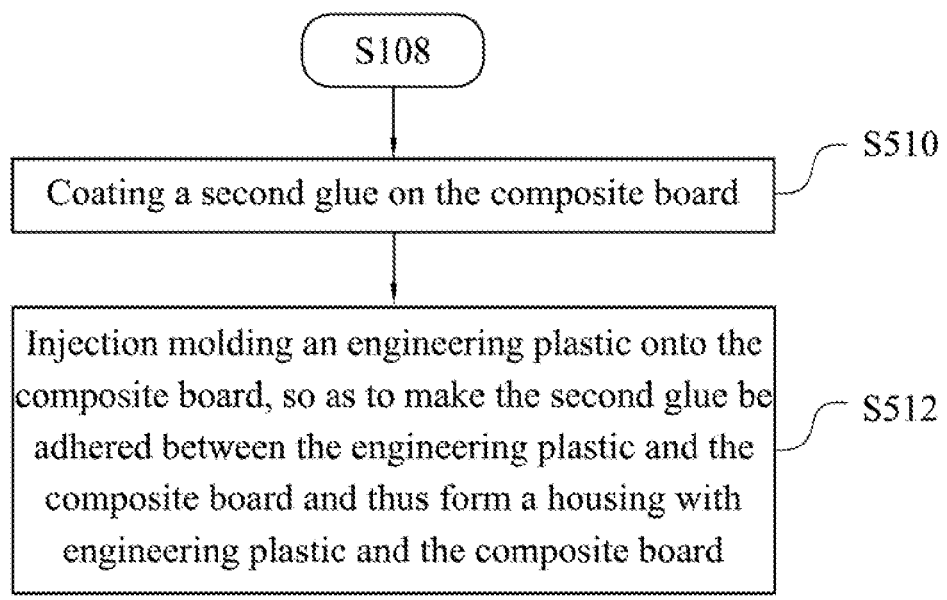
FIG. 4 is another detailed flow chart diagram of the housing manufacturing method in FIG. 1.
Figure 6A:
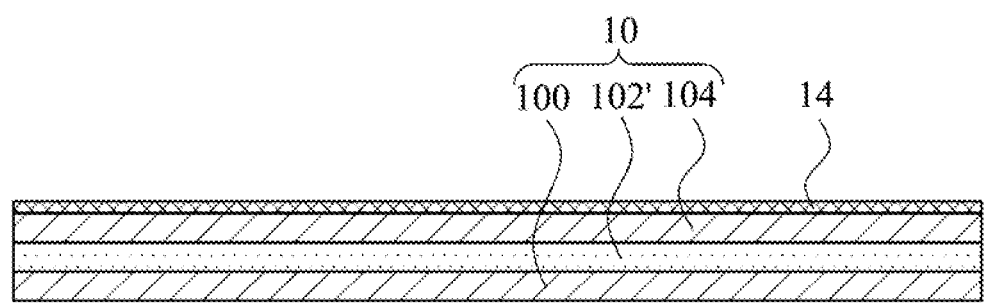
FIG. 6A and FIG. 6B are schematic diagrams corresponding to the steps of the housing manufacturing method in FIG. 4.
Figure 6B:
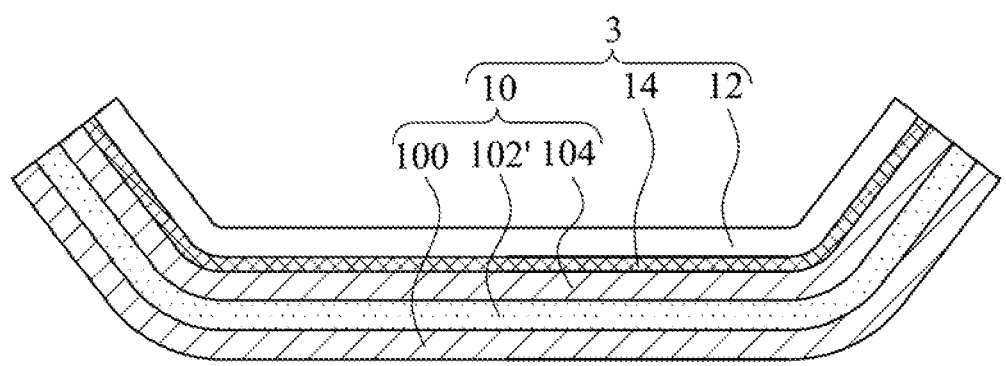

However, the composite board 10 of the disclosure not only can be combined with the engineering plastic 12 by using the above-mentioned steps. FIG. 4 is another detailed flow chart diagram of the housing manufacturing method in FIG. 1. FIG. 6A and FIG. 6B are schematic diagrams corresponding to the steps of the housing manufacturing method in FIG. 4. The embodiment of FIG. 4 replaces the steps S110 and S112 in FIG. 3 by steps S510 and S512 shown below.

S510: coating a second glue 14 on the composite board 10.

S512: injection molding an engineering plastic 12 onto the composite board 10, so as to make the second glue 14 be adhered between the engineering plastic 12 and the composite board 10 and thus form a housing 3 with engineering plastic 12 and the composite board 10.

During injection molding, the composite board 10 can be placed in a mold (not shown) after the second glue 14 is coated on the composite board 10, and then the engineering plastic 12 is injection molded onto the composite board 10, so as to make the engineering plastic 12 be combined with the composite board 10 by the second glue 14 and thus obtain the housing 3.

Figure 7:
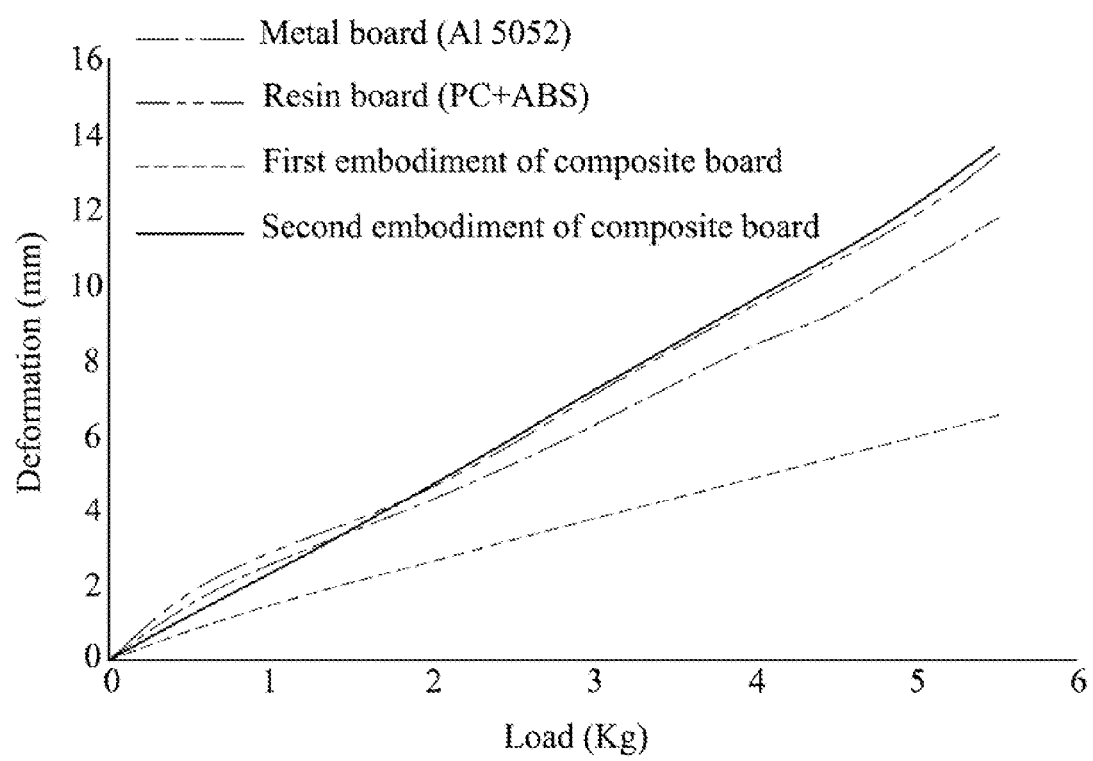
FIG. 7 is a bending test chart related to two embodiments of composite boards according to the disclosure and two boards that respectively using two known housing materials.

FIG. 7 is a bending test chart related to two embodiments of composite boards according to the disclosure and two boards that respectively using two known housing materials.

As shown in FIG. 7, in two embodiments of composite boards according to the disclosure, the thickness of the used first fiberglass plates and the thickness of the used second fiberglass plates are 0.4 mm. After steps of coating a first glue on the first fiberglass, covering the second fiberglass on the first glue, and continuously hot laminating the first fiberglass plate, the first glue, and the second fiberglass plate based on the temperature range of 50-70° C. and the pressure range of 5~6 Kg/cm$^2$ for 15 minutes, two cured cushion adhesive layers respectively with thickness of 1.1 mm and 1.3 mm are formed and respectively corresponds to the foregoing two embodiments of composite boards. As to the first embodiment of composite board (i.e., the thickness of the cushion adhesive layer is 1.1 mm), the density is about 1.38. As to the second embodiment of composite board (i.e., the thickness of the cushion adhesive layer is 1.3 mm), the density is about 1.28.

One of the known housing materials is a resin board of which the thickness is 1.9 mm and the material is polycarbonate-ABS, and another of the known housing materials is a metal board of which the thickness is 0.8 mm and the material is Al 5052. As to the resin board, the density is 1.12 g/cm$^3$, the elastic modulus is 4.6 Gpa, the tensile strength is 67 Mpa, the percentage of fracture deformation is 8%, the specific stiffness is 4.11, and the specific strength is 59.8. As to the metal board, the density is 1.8 g/cm$^3$, the elastic modulus is 44.8 Gpa, the tensile strength is 230 Mpa, the specific stiffness is 24.89, and the specific strength is 127.7. It can be seen that the metal board has better stiffness, and the resin board is lighter, but both of them are high-cost materials.

In FIG. 7, it can be seen that the load-deformation curve of the first embodiment of composite board (i.e., the thickness of the cushion adhesive layer is 1.1 mm) almost coincides with the load-deformation curve of the resin board, so the stiffness of the first embodiment of composite board is similar to the stiffness of the resin board. Furthermore, under the same load, the deformation of the second embodiment of composite board (i.e., the thickness of the cushion adhesive layer is 1.3 mm) is smaller than the deformation of the metal board, so the second embodiment of composite board has better stiffness.

According to the above two embodiment of composite boards, it can be seen that the stiffness of the composite board that is formed by laminating two fiberglass plates is similar to the stiffness of the foregoing resin board. Moreover, by increasing the thickness of the cushion adhesive layer between the fiberglass plates, the density of the composite board can be reduced, and the stiffness of the composite board can be better than the foregoing metal board.

According to the foregoing recitations of the embodiments of the disclosure, it can be seen that the laminated fiberglass plates of the composite board manufactured by the housing manufacturing method of the disclosure provide stiffness that is similar to metal, and the cushion adhesive layer that is laminated between the fiberglass reduces the density of the composite board. Hence, the composite board of the disclosure can effectively reduce the cost and still has the features of high stiffness and lightweight. Furthermore, the composite board manufactured by the housing manufacturing method of the disclosure can be combined with the engineering plastic by injection molding, so as to manufacture the low-cost housing that can be widely applied to various kinds of electronic products.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fail within the scope of the following claims.

What is claimed is:
1. A housing, comprising:
 a composite board comprising:
  a first fiberglass plate;
  a second fiberglass plate; and
  a cushion adhesive layer adhered between the first fiberglass plate and the second fiberglass plate; and
 an engineering plastic fixed on the composite board to form an outer surface of the housing, wherein a surface of the composite board on which the engineering plastic is fixed is substantially entirely covered by the engineering plastic;
 wherein the composite board has at least one slotted hole, and the engineering plastic is embedded in the slotted hole.
2. The housing of claim 1, wherein the cushion adhesive layer is formed by curing a first glue.
3. The housing of claim 2, wherein the material of the first glue comprises a chemical resin having a function of foaming.
4. The housing of claim 1, wherein the cushion adhesive layer is a polyurethane foam layer.
5. The housing of claim 1, further comprising a second glue adhered between the composite board and the engineering plastic.

* * * * *